Feb. 14, 1950 P. MARIENTHAL 2,497,618
PROPORTIONAL MIXING SCALE
Filed Feb. 10, 1947 4 Sheets-Sheet 1

INVENTOR.
PAUL MARIENTHAL,
BY
Justin W. Macklin
ATTY.

Feb. 14, 1950 P. MARIENTHAL 2,497,618
PROPORTIONAL MIXING SCALE
Filed Feb. 10, 1947 4 Sheets-Sheet 2
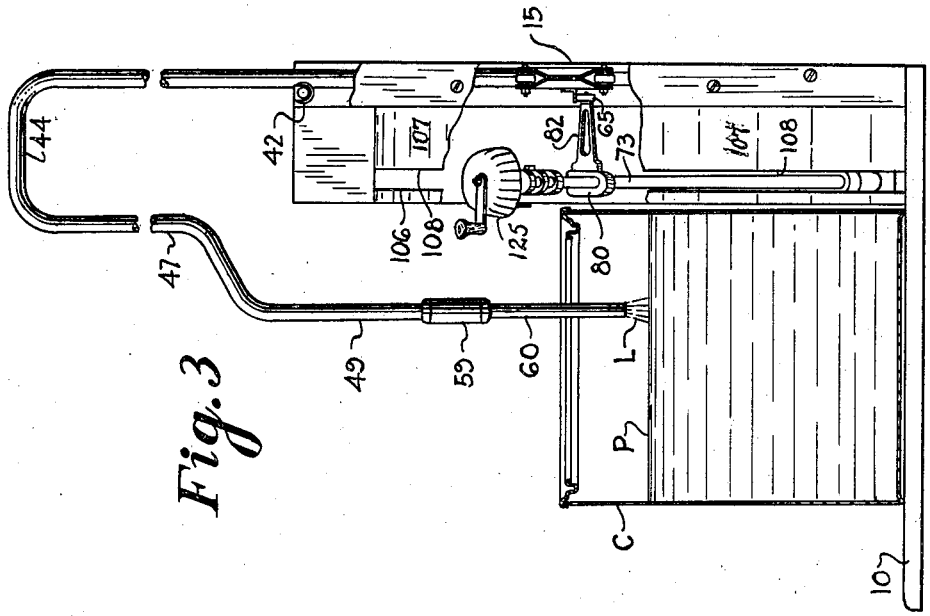
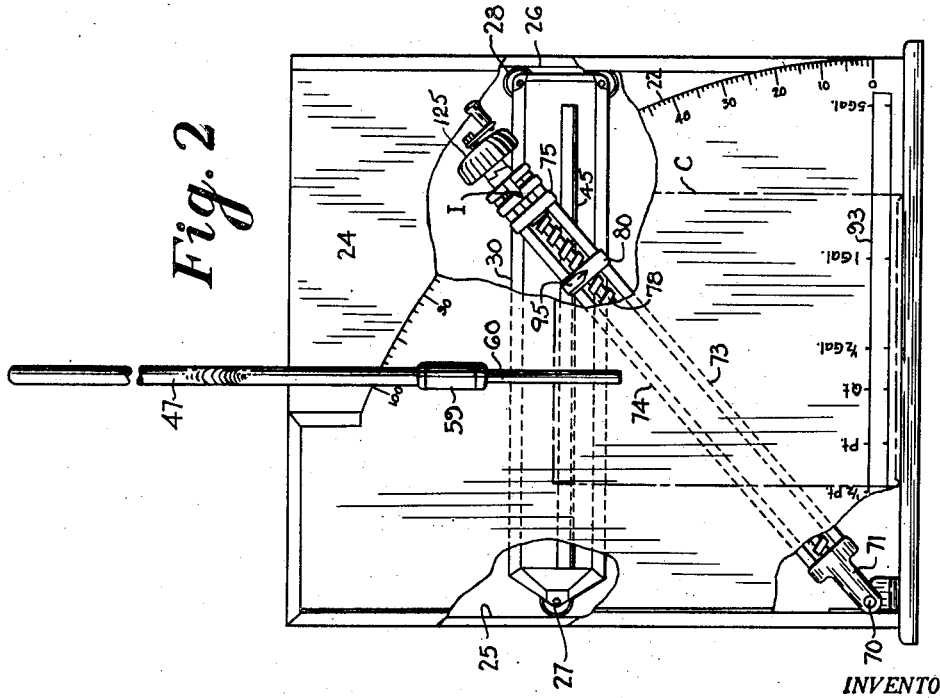
INVENTOR.
PAUL MARIENTHAL,
BY Justin W Macklin,
ATTY Feb. 14, 1950     P. MARIENTHAL     2,497,618
PROPORTIONAL MIXING SCALE Filed Feb. 10, 1947             4 Sheets-Sheet 3

INVENTOR.
PAUL MARIENTHAL.
BY
ATTY

Feb. 14, 1950 P. MARIENTHAL 2,497,618
PROPORTIONAL MIXING SCALE

Filed Feb. 10, 1947 4 Sheets-Sheet 4

INVENTOR.
PAUL MARIENTHAL,
BY Justin L. Macklin,
ATTY.

Patented Feb. 14, 1950

2,497,618

UNITED STATES PATENT OFFICE 2,497,618

PROPORTIONAL MIXING SCALE

Paul Marienthal, Detroit, Mich., assignor to The Sherwin-Williams Company, Cleveland, Ohio, a corporation of Ohio Application February 10, 1947, Serial No. 727,523

8 Claims. (Cl. 33—126.7)

The general object of this invention is to provide a device for use in facilitating the rapid and accurate mixing of different liquids to attain certain desired results from predetermined constituent proportions.

The invention is particularly useful in the mixing of paints to obtain precise matching of shades and colors.

It may be useful in the mixing of various kinds of liquids for any end result requiring an accurate proportional relationship.

The use of such a proportional mixing scale or liquid graduating means and some of its essential advantages to paint retail dealers are set forth in Patent No. 2,169,952, dated August 15, 1939.

Another patent, No. 2,237,443, granted April 8, 1941, shows, describes and claims modifications attaining certain additional advantages.

The present invention makes use of similar principles, and of the same general idea, as set forth in those patents, and has for others of its objects:

The provision of a simple practical embodiment which may be more convenient to use and which is adaptable for a wider range of mixing containers, or, more specifically, a larger number of sizes of paint cans;

The provision of a device which shall be quickly adjustable for measuring proportional quantities in receptacles or cans ranging, for example, from one half pint to five gallons, and which shall be operable in a uniform manner for all of such sizes;

To provide such a device by which the proportions are determined by the same means and may be read on the same scale for all of the sizes or capacities of containers or cans, and with the same accuracy when mixing in small containers as when mixing largest containers;

The provision of a durable device of this nature which may be cheaply manufactured, and having a minimum number of operating parts likely to become worn or get out of order;

Convenience of adjusting the light transmitting element by which the height of the liquid is determined, and in so mounting the element as to facilitate pouring into the receptacle or can.

Other objects and advantages of construction and use will become apparent in the following description which relates to the drawings, the essential characteristics of this invention being summarized in the appended claims.

Referring to the drawings,

Fig. 2 is a similar view with parts of the frame of the device broken away;

Fig. 3 is a side elevation looking toward the right of Fig. 2; also having parts of the frame broken away;

Figure 8:
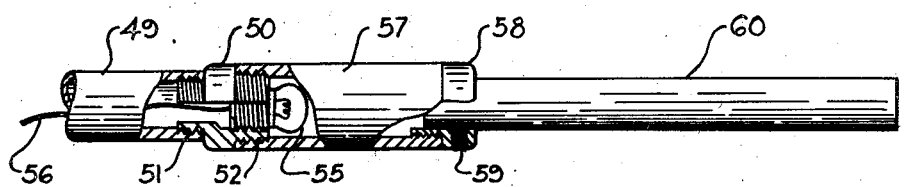
Fig. 8 is a sectional detail showing the light transmitting element and light bulb mounting.

As indicated above, a characteristic of the present invention constituting an improvement over prior devices is the provision of a proportional adjustable means by which one element moving across a single large and easy to read scale may be readily so adjusted as to cause movement of the visual height determining element, from the bottom of the can or other receptacle to the top or full position, and for sizes of the cans ranging from very small, say, one-half pint, to large cans, for example, five gallons or more.

In the drawings, 10 indicates a base member on which is mounted an upright casing shown as substantially rectangular, and comprising a back plate 15 and side and top members 16, 17 and 18, partially covered in front by a plate 20 spaced forwardly of the back plate having one side formed with an arcuate edge and carrying a scale 22 on the front surface. A plate member 24 is offset rearwardly from the plane of the plate 20. The operating parts, principally within the housing thus formed, will now be described.

Carried by the side walls 16 and 17 are upright channels 25 and 26, forming track members engaged by rollers or wheels 27 and 28, supporting and guiding the opposite ends of a transverse carriage 30. As shown, there is preferably one wheel at one end of the carriage and two at the other end, which arrangement I find, tends to prevent binding and facilitates freedom of vertical movement of the carriage.

This carriage supports the liquid height determining member, which may comprise essentially a loop arm extending upwardly out of the frame, and then downwardly, supporting the liquid height determining element.

Figure 4:
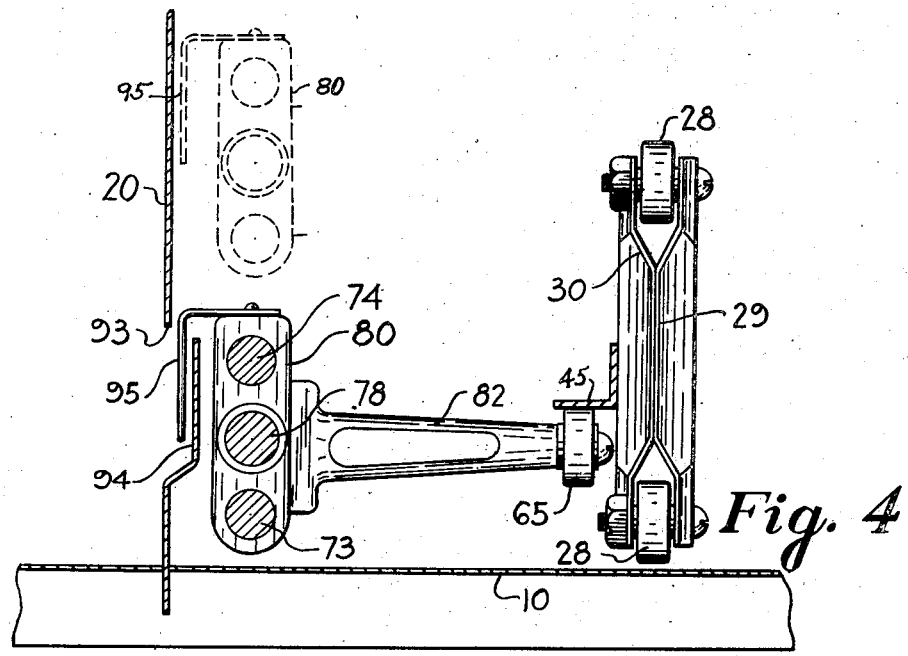
Fig. 4 is a vertical transverse sectional detail on an enlarged scale on a plane indicated by the line 4—4 of Fig. 1.

In the construction shown, the carriage comprises two plate members 29, depressed, as indicated (Fig. 4), forming a central bracing portion. Near the middle, these plate members are shaped to form a socket 39 embracing the lower end of a tube or rod 40. The member 40 may be secured to the carriage by spot welding, if desired, or may be adjustably held as by a screw 41 passing through one flange of an angle strip 45. This angle strip presenting a forwardly extending flange forms a track to be engaged by a roller 65 to move the carriage as will be presently described.

As shown, the tube 40 extends upwardly to a height sufficient to extend above the top of the housing when in lowermost position, and normally rests against a roller, indicated at 42, mounted in the housing. From a forward extension 44 of the tube it extends downwardly as at 47, and is then curved outwardly and then downwardly again at 49 where it is threaded to receive the connection of the light transmitting element. As appears in Fig. 8, a fitting 50 is threaded into the tube 49, and is provided with a socket to receive the threads of a small light bulb 55. External threads at 52 on the member 50 receive threads of one end of a sleeve 57, the other end of which receives the threads of a collar provided with a set screw or other holding means to engage the light transmitting element 60.

Current may be supplied to the lamp 55 by any suitable means. As shown, a single wire 56 leads from one terminal of the bulb fitting, and which may pass upwardly through the tube 49 and around through the tube 40, to a suitable source of current supply to which the grounded side of the light bulb would also be connected.

Within the housing is a swinging arm carrying the roller 65 for moving the slide 30. This swinging arm is shown as having an end member 71 pivoted at 70 to a support fixed on the base member at the left of the housing. Fixed to and extending from the pivoted member 71 are parallel slide rods 73 and 74, rigidly fixed at the outer ends in a head member 75. This head member 75 also furnishing a journal or bearing for one end of a screw 78, and having its other end rotatably engaging the member 71, and serving to move the carriage supporting slide which has a connection with the screw 78 and slidably embraces the rods 73 and 74.

Rigidly fixed on the slide member 80 is a rearwardly extending arm 82, having a suitable stud on which the roller 65 is carried.

Thus it will be seen that as the pivoted arm member with its slide member 80 is swung upwardly to a given position, such as shown in Fig. 2, the carriage 30 is moved a predetermined distance—depending upon two factors, namely, the position of the slide 80 and its roller 65, and the angle of elevation of the arm.

The positioning of the carriage supporting slide 80 may be determined according to the size of the receptacle, i. e., the paint can, and in any given setting a full permitted movement of the swinging arm will cause a movement of the carriage and height indicator corresponding to raising the slide and liquid level indicator to the full height of the receptacle.

Figure 6:
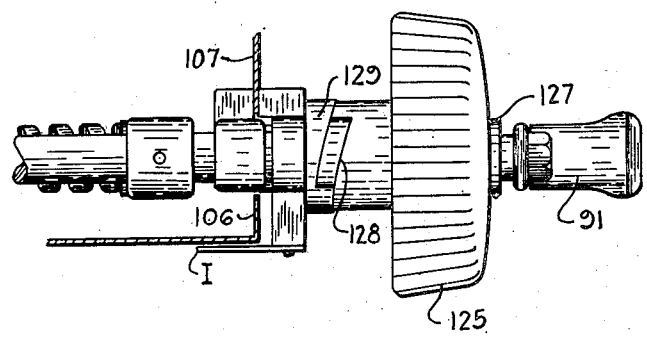
Figs. 6 and 7 are enlarged fragmentary details of the container size settable means and the indicator locking means.
Figure 7:
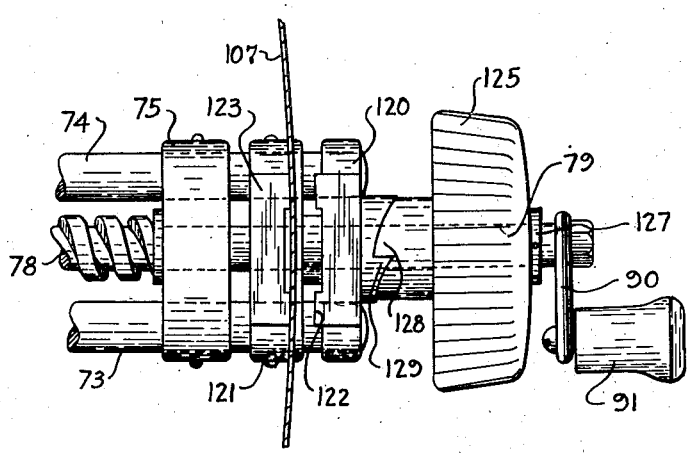

Referring particularly to Figs. 6 and 7, the screw 78 is shown as having an extended shank 79, the end of which may be provided with a suitable small crank 90 provided with a handle 91 by which the screw 78 may be rotated to move the slide 80 with its arm and roller toward or away from the pivot 70.

Figure 1:
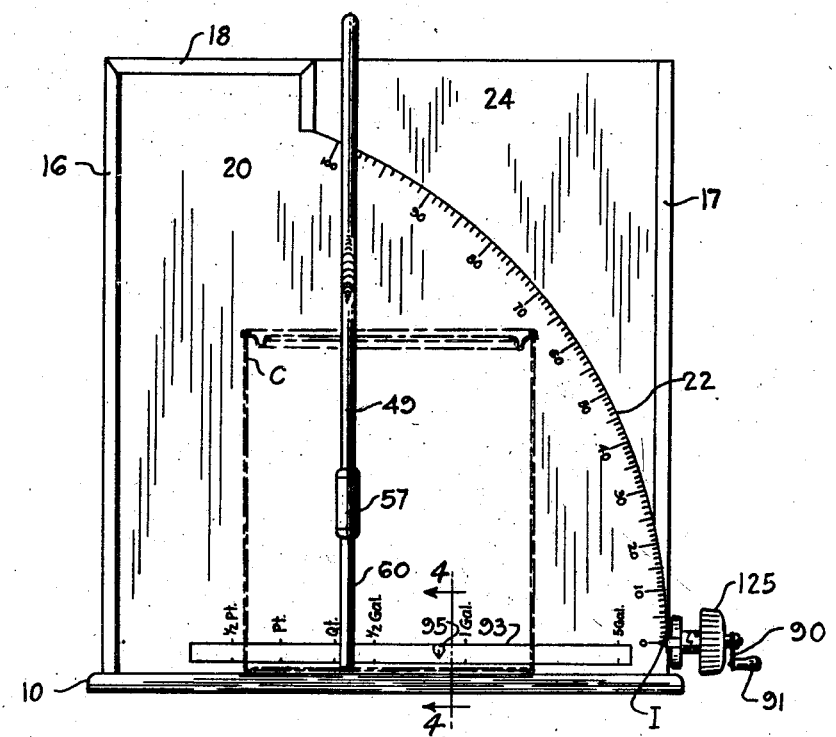
Fig. 1 is a front elevation of my invention showing a paint can in broken lines.

For convenience in setting the slide 80 to proper operative position for a given size of receptacle, the front wall member 20 is provided with an opening 93 and a portion of the wall is offset, as indicated at 94 (Fig. 4) to carry indicia or scale marks, such as shown in Figs. 1 and 2, from one half pint to five gallons.

Mounted on the slide member is a pointer 95 projecting down over the inset indicia bearing surface 94, when the slide arm is in the down position. The pointer thus extends below the upper edge of the slot 93, as appears in Fig. 1, and into visible position relative to the scale marks appearing both on the offset portion 94 and above the edge of the opening 93.

On the arcuate edge 22 of the plate 20 is a scale which may be suitably marked or calibrated, 0, 10, 20, etc., to 100 (Figs. 1 and 2). Carried on the swinging arm is a pointer I projecting outwardly and in front of these scale marks of this arcuate scale. The pointer is shown as mounted on a cross member 120, slidably fitting the ends of the rod members 73 and 74, and loosely embracing the screw shank 79.

The material of the plate 20 may be turned rearwardly to form a flange 106, and an arcuate strip 107, conforming to the curvature of the edge 22 serves to close the housing, except for an open slot 108 along which rods of the arm move for the full swing of that arm.

To hold the swinging arm in any given raised position, I provide a clamping means at the end of the arm, operated by a suitable knob for gripping the strip 108 by moving the member 120 toward a bridge member 121 to cause the coacting projections 122 and 123, respectively, to be pressed against the edge of the strip 108.

The hand wheel or knob 125 is shown as rotatably mounted on the screw stem 79 and held against outward movement—to the right, Figs. 6 and 7—by a collar 127.

Rigid with the hand wheel are surfaces 128 coacting with complementary cam surfaces 129, which are rigid with the slide member 122, which effectively move the clamp members 122 and 123 together, as the knob 125 is turned from the position shown in Fig. 7 to the clamping position shown in Fig. 6.

A mixing receptacle shown as a paint can designated C is supported on the base member 10, and obviously this may be of any size up to the capacity of the device which is limited only by the amount of movement of the carriage 30 and associating parts.

Assuming that a suitable source of current is connected and switched on to the lamp 50, the light transmitting rod 60 or other liquid level indicator which may consist of any suitable light transmitting medium, such as synthetic resin, or, for example, a well-known synthetic substance which is called "Lucite," is thus illuminated and projects a concentrated beam of light longitudinally and essentially axially from its lower end.

In Fig. 3 the paint indicated at P is rising to a level close to the lower end of the light transmitting rod 60 where light rays, indicated by the broken lines L, form an illuminated spot on the paint surface which may be assumed is rising while pouring paint into the can C.

In using the device, first the swinging arm and slide may be raised by grasping the end of the arm at the knob 125, and the can C may be placed in such a position that the indicator 60 is somewhat to one side of the can facilitating pouring. The arm is then lowered until the lower end of the liquid height indicator, i. e., the rod 60, rests on the bottom of the can, at which point the indicator I should stand at zero on the arcuate scale, as shown in Fig. 1.

If due to variation of the bottom of the receptacle as at the raised portion of the bottom of the can, the pointer does not register properly on the scale, an adjustment may be made by any suitable means to relatively raise or lower the level indicator.

Figures 5, 9:
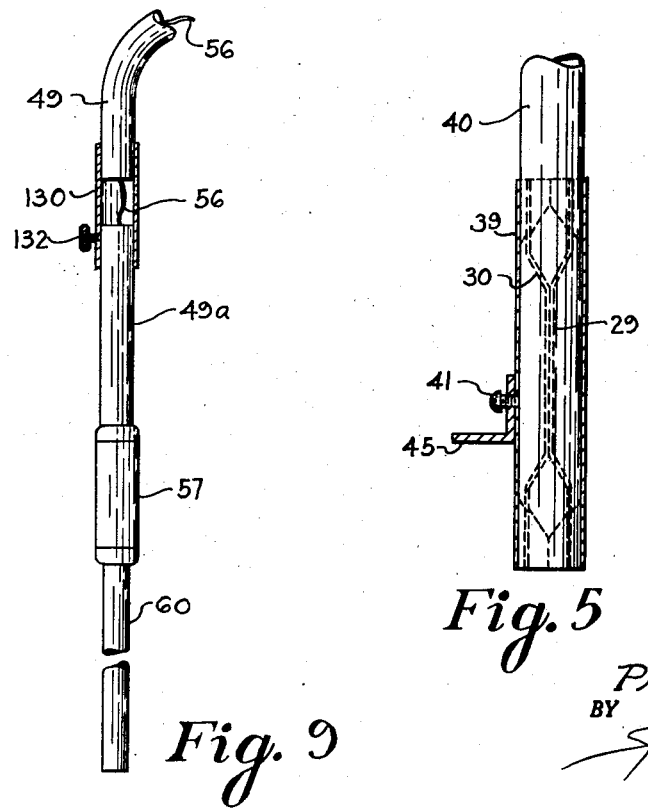
Fig. 5 is a sectional detail on the same scale showing the connection of the carriage member with the support for the height indicator for the liquid.
Fig. 9 is a detail showing an adjustable suspension for the light transmitting means.

A convenient adjustment is indicated in Fig. 9, where a connecting sleeve embraces adjacent and aligned sections of the downwardly extending portion 49 of the rod. Here the light carrying extension is designated 49a, and it is shown as received in a sleeve 130 which is rigidly held on the tube end 49, while a thumb screw, indicated at 132, may effect the adjustment by loosening and tightening the screw while the lower end of the indicator element 60 is allowed to rest upon the bottom of the can.

Another adjustment not so convenient may be effected by loosening the screw 41 and raising and lowering the entire indicator carrier member 40 with relation to the carriage 30, Fig. 5.

The scale on the curved edge 22 may be divided in units from 0 to 100, or any other number of convenient parts suitable for the use to which the graduating device of this invention is to be put.

As the swinging arm rises, lifting the carriage 30, the swinging motion is translated into the vertical motion and it is, of course, the vertical motion which is to be accurately divided for measuring purposes.

Wherefor, the curved scale is divided so that the distance from 0 to 10 will effect one-tenth of the vertical movement, from 0 to 50, one-half, and, likewise, from 0 to 100, the entire movement, while all intermediate movements effect a predetermined proportionate lifting movement, as indicated by the numerals at which the indicator I may stand. As shown, the spacing of the markings on the curved scale are increasingly longer as they approach the one hundred mark.

Assuming then that the liquid level indicator is adjusted to reach the bottom of the can when the indicator I stands at zero—after placing the can in position—the can size indicator 95 has been moved by turning the crank handle 91 to a position corresponding to the size or capacity of the can to be used. The mixing is as follows: If, now, three colors of paint are called for by the mixing chart in varying proportions, say, for example, 18 parts, 52 parts and 30 parts of colors A, B and C, respectively, the indicator on the the swinging arm would be set at 18 for the first color A, and then clamped by turning the knob 125, in which position the slide 80, arm 82 and roller 65 will have moved to raise the carriage 30, and thus the level indicator 60 upwardly from the bottom of the can a distance corresponding to eighteen/one-hundredths of the height of the can.

The paint or lacquer, as the case may be, of the color A is now poured into the can, and as the level rises its approach to the lower end of the rod 60 is clearly discernable and the bright circle of light reduces in size, warning that the surface is nearing the lower end, at which time the circle of light is the smallest and brightest. Pouring can be stopped just as the paint reaches the lower end to avoid having paint ahere to the end of the rod.

If the paint has touched the lower end of the rod 60, it is only necessary to swing the handle 125 up to bring the light rod above the can and wipe off the end. For the color B, the knob is now operated to clamp the arm with the indicator I at the point 70 on the arcuate scale to indicate when 52 parts or percent of the color B have been added to the 18 parts of the color A. Color B is then poured into the can until the liquid level again reaches the lower end of the rod 60.

For the third color C, the indicator I is placed at the 100 mark on the arcuate scale, at which point thirty percent more liquid may be added, which will substantially fill the can with the precise mixture desired.

In the use of the transparent light transmitting media, such as described, some of the light, of course, escapes along the surface, but the major portion is directed in a beam, from the lower end.

It is to be understood that the liquid level indicator may comprise a tube, such as shown in a previous patent to E. D. Holmes, No. 2,169,952 and from which the light is projected at the open lower end.

The foregoing manner of use, particularly the pouring of the successive colors, is similar to that set forth in that patent, 2,169,952.

Essential advantages which are attained by the present invention are the convenient use of the one large proportional scale, and a means for setting the illuminating and measuring element in its different proportionate positions for the various sizes of cans or receptacles.

From the foregoing description it will be seen that I have provided a vertically movable and settable measuring element with a means for accurately positioning it proportionately to a main scale, and for varying the extent of proportional movement by pre-setting a connection between the carrier for the measuring element and a member traveling along the main scale, and I have additionally provided visual means for determining the setting which, in turn, determines the proportional amount of measuring movement.

Having thus described my invention, what I claim is:

1. A liquid measuring scale for different sizes of containers, comprising a frame, a vertically movable liquid level indicator carried on said frame, a carriage for the indicator having a horizontal track, vertical guide members on the frame for said carriage and an arm pivoted to the frame to swing across the path of said carriage at varying angles to the track, a settable element on the arm adapted to engage and move along the track to support the carriage, and an arcuate scale fixed on the frame showing the arm position graduated commensurately with even divisions of vertical movement of the indicator, and means for positioning said settable element at different positions along the arm for different sizes of containers.

2. In a device of the character described, the combination of a rigid support for a receptacle and a fixed standard rising above the same, a carriage movably mounted on the standard, a liquid level indicator supported by the carriage, carriage raising means comprising a swinging arm pivoted at one end to the support and having a predetermined limited motion, a scale for dividing said motion into proportionate vertical distances of indicator movement, a settable connection movable along said arm and adapted to cause different amounts of movement of the carriage for a full movement of the element along the scale, and position-indicating means for said settable connection corresponding to different sizes of receptacles.

3. A mixing scale for proportionally dividing the height of different sizes of containers with uniform accuracy comprising a supporting table, a standard fixed with respect to the table and having a guideway, a carriage movable along said guideway, a liquid level indicator fixed on the carriage and adapted to be projected into a container, the carriage having a trackway movable therewith, a pivoted arm having a pivot fixed with relation to the table and having an element adapted to be positioned at different distances from the pivot of said arm and to move along said trackway for raising and lowering the carriage, indicating means for locating said element on the swingable arm to correspond to different sizes of containers, and a scale indicating the angular position of the arm and showing the height of movement of the carriage relative to any size of container.

4. The combination of a support for a receptacle, a vertical guideway in fixed relation thereto, a carriage movable along the guideway, a liquid level indicator supported by the carriage and adapted to be projected into a receptacle on the support, a pivoted arm having a fixed pivot so positioned that the arm may swing across the path of the carriage and having carriage engaging means settable at different distances from the pivot for governing the rate of movement of the carriage relative to swinging of the arm, a scale indicating the angular position of the arm and the height of the carriage relative to the receptacle.

5. The combination of a support for a receptacle, a vertical guideway in fixed relation thereto, a carriage movable along the guideway, a liquid level indicator supported by the carriage and adapted to be projected into a receptacle on the support, a pivoted arm so mounted as to swing across the path of the carriage and having carriage engaging means settable at different distances from the pivot for governing the rate of movement of the carriage relative to swinging of the arm, a scale indicating the angular position of the arm and the height of the carriage relative to the receptacle a member carried by the support in fixed relation to the scale, and a securing means carried by the pivoted arm coacting with said member for holding the arm in adjusted position with relation to the scale.

6. In a proportional mixing scale adapted to divide the heights of different sizes of containers in the same ratio, a support for a receptacle, a standard fixed with respect to said support and having a guideway, a carriage movable along said guideway, a liquid level indicator fixed on the carriage and adapted to be projected into a container on said support, the carriage having a trackway, means movable along the trackway for raising and lowering the carriage, an arm pivoted in fixed relation to said support, a slide on the arm carrying said means and adapted to be positioned at different distances from the pivot of said arm, a screw for moving the slide along the arm, a scale indicating the position of the arm to show the height of the carriage and liquid level indicator relative to a container on said support.

7. In a device of the character described, the combination with a support for a receptacle, a vertical guide fixed with relation to the support, a carriage movable along said guide, a liquid level indicator supported by the carriage and adapted to project into a receptacle on said support, an arm pivoted near one side of the support and swingable across the path of the carriage, a horizontal member on the carriage, a settable projection on the arm engaging and movable along said member, an arcuate scale fixed with relation to said support, means for clamping the arm in different positions along the scale, and a horizontal scale for indicating the position of the settable projection on the arm corresponding to different sizes of receptacles.

8. In a liquid mixing scale the combination of a frame, a vertically movable carriage, a liquid level marking element mounted on the carriage, said carriage having a horizontal track thereon, means for moving said level marking element through varying distances proportional to the height of a receptacle, means for dividing vertical movement of said element into predetermined proportional amounts comprising a swingable arm pivoted to the frame, a connection between the arm and the track on the carriage including an element movable along the track and settable along the arm, a scale extending over an arc including the total angle of movement of the arm calibrated to indicate even increments of vertical movement of the level marking element, and means for adjusting the connection between the arm and the track on the carriage for setting said connection in various positions along the arm for different heights of receptacles.

PAUL MARIENTHAL.

REFERENCES CITED

The following references are of record in the file of this patent:

UNITED STATES PATENTS

| Number | Name | Date |
|---|---|---|
| 2,169,952 | Holmes | Aug. 15, 1939 |
| 2,237,443 | Marienthal | Apr. 8, 1941 |
| 2,354,259 | Grubelic | July 25, 1944 |